May 6, 1941.    E. J. DUCATE    2,240,640
FLEXIBLE DOUBLE SKIRT PISTON
Filed Oct. 19, 1938    2 Sheets-Sheet 2
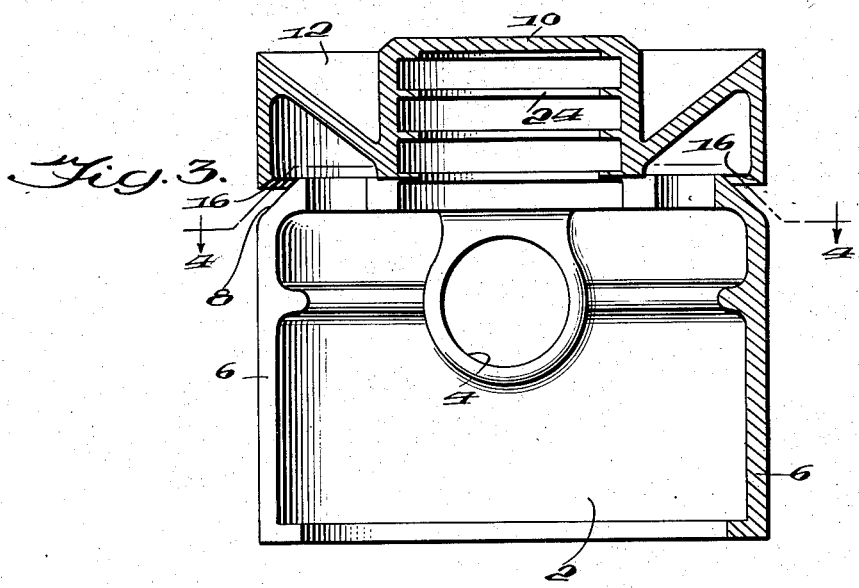
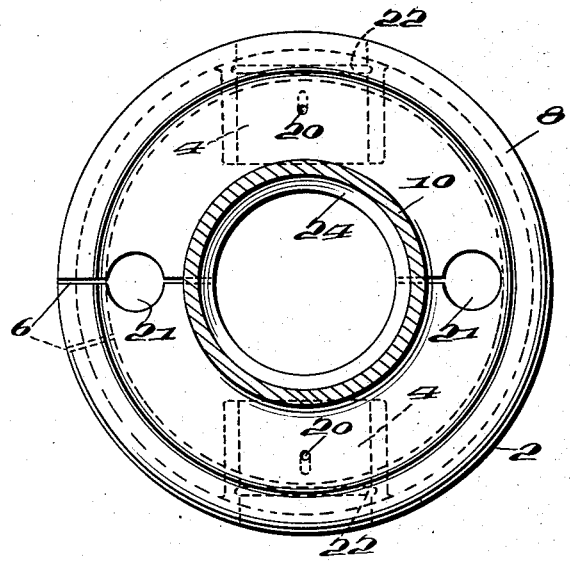
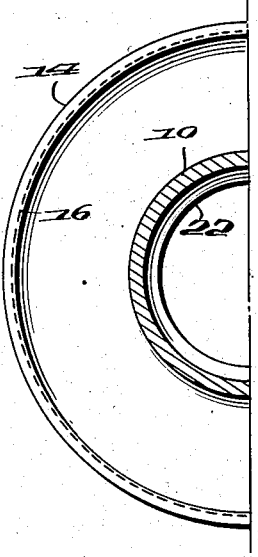

Patented May 6, 1941

2,240,640

UNITED STATES PATENT OFFICE 2,240,640

FLEXIBLE DOUBLE SKIRT PISTON

Edward J. Ducate, Amarillo, Tex., assignor of one-fourth to Edward J. Dee and one-fourth to Orville H. Wilkinson, Amarillo, Tex.

Application October 19, 1938, Serial No. 235,872

6 Claims. (Cl. 309—8)

My invention relates to improvements in flexible double skirt pistons.

An object of my invention is to provide a piston for an internal combustion engine, or motors or engines in which pistons are used, which piston is provided with two skirts, and which may be designed to use conventional piston rings, or may be successfully utilized without piston rings.

A further object of my invention is to provide a piston, the lower skirt thereof substantially conventional in its form, with the exception of the upper portion thereof which is closely associated with an extra piston skirt located just beneath the head of the piston.

Another object of my invention is to provide a piston, the head of which utilizes a dome portion in the center thereof and has around the edges of the dome a concaved head.

A still further object of my invention is to provide a piston which utilizes an auxiliary skirt, the lower edge of which is between the piston-head and the wrist-pin bearings, or other connecting bearings or rods.

A still further object of my invention is to provide a piston having a concave head and an upstanding dome in the center of the concavity, and which dome is provided with internally circumferential oil-retaining fins.

In the accompanying drawings:

Fig. 3 is a vertical cross-section transverse to the wrist-pin bearings;

Fig. 4 is an irregular horizontal cross-section on the line 4—4 of Fig. 3, looking in the direction of the arrows; and Fig. 5 is an irregular fragmentary horizontal cross-section on the line 5—5, looking in the direction of the arrows.

Figure 1:
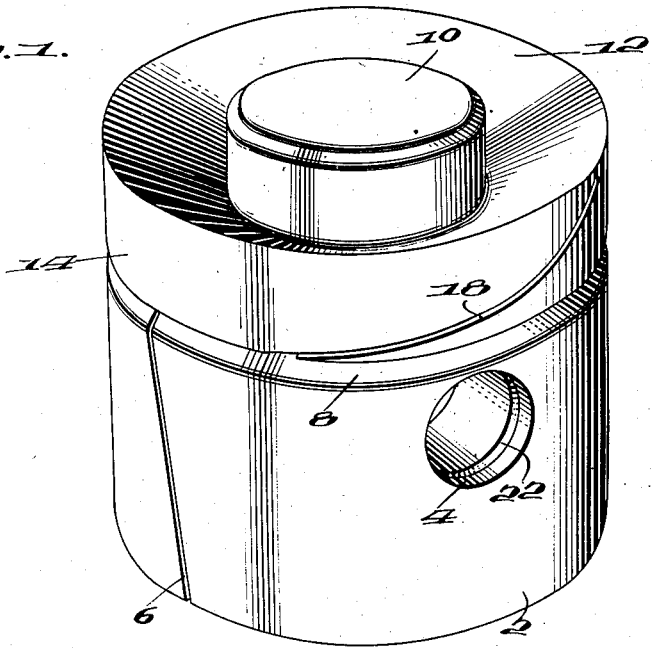
Fig. 1 is a perspective view.
Figure 2:
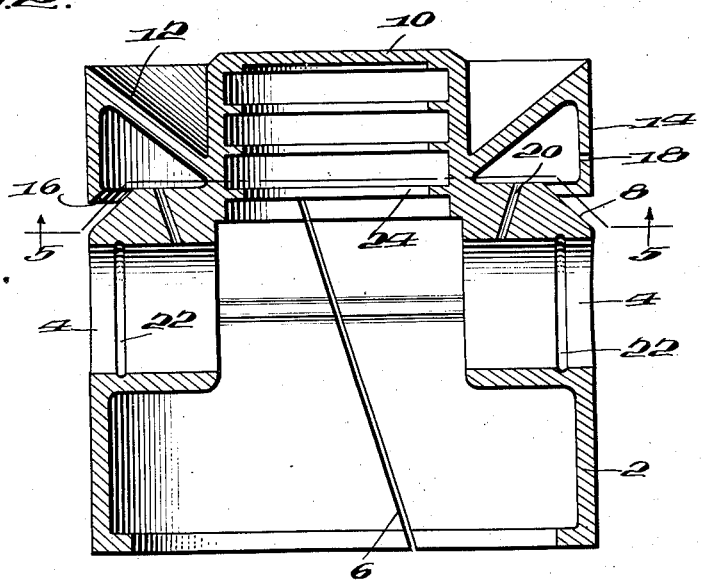
Fig. 2 is a vertical cross-section through the wrist-pin bearings.

The lower portion of the piston is substantially conventional in its form and is provided with a lower skirt 2 which extends beneath the wrist-pin bearings 4. This skirt 2 is also provided with the conventional slit 6 which is provided to compensate for normal expansion during engine operation.

Above the wrist-pin bearings 4, the skirt 2 is formed substantially in the shape of a head portion which is beveled off at the edges 8.

Above this portion of the piston I provide a dome 10 in the center of the piston, and a concave piston head 12 around the dome 10 and extending outwardly therefrom and having a diameter slightly larger than the diameter of the main portion of the piston and the piston skirt 2.

Around the periphery and extending downwardly therefrom and approximately in alignment with the skirt 2, I provide an auxiliary skirt 14. This skirt 14 is provided with beveled edges 16 at its lower extremities and extends downwardly slightly beneath the upper edge of the beveled edges 8. The skirt 14 is also provided with a slit 18 so that proper expansion and contraction may take place on heating and cooling.

The piston head 12 is relatively thin and beneath the head 12 and inside of the skirt 14 a space is provided in which oil may be retained and splashed as it is scraped from the cylinder wall by the beveled edge 16 on the down stroke of the piston. The oil which is introduced into the space beneath the piston-head 12 is utilized first for cooling and the radiation of heat from the piston head 12. Later, this oil which is introduced into the space beneath the piston head 12 escapes downwardly through the ducts 20 and is introduced into the wrist-pin bearings 4, or through the openings 21 into the crank-case. In these wrist-pin bearings 4, I provide a conventional wrist-pin retainer groove 22.

Inside of the dome 10 I provide a plurality of circumferential fins 24 which are for retaining oil within the dome 10. The oil which is retained by these fins 24 is placed thereon by the ordinary splash created within the crank-case of the internal combustion engine. This oil has a cooling effect upon the dome 10 and by radiation on the head 12.

By constructing a piston as described above, I have provided a piston with relatively flexible head having sides, or a skirt, which conform readily to a cylinder wall. This skirt 14, provided on the head 12 and having beveled edges 16, cuts back oil from the cylinder wall, thereby materially reducing waste of oil. By thus cutting back the oil from the cylinder wall, the oil is introduced into a chamber beneath the piston-head where it is used for cooling the piston-head and for lubricating the wrist-pin bearings as well as the cylinder wall.

By providing a piston of this construction with a flexible head, the piston may be cut and machined so that it will expand and conform with the cylinder wall, thereby compensating for the usual wear now found to result from the use of conventional types of pistons. By making a piston as described above, it is possible to reduce the weight of the piston as compared with conventional types of pistons, and thereby to reduce torsional strain on connecting rod bearing and the crank-shaft.

By providing an upper skirt which is split on a bias to the front of the motor, the piston wall drag or pressure is minimized as well as providing a means for compensating for excessive expansion.

By providing the dome 10 in the center of the piston-head, with the concave head 12 extending therefrom, I have provided a piston which materially minimizes the commonly occurring "piston slap," which follows after the wrist-pins have become worn and/or the cylinder walls or piston rings have worn so that the piston does not reciprocate axially of the cylinder. By providing a piston-head of this construction, the force of the explosion within the firing chamber is more equally distributed and centralized; consequently, the force of the explosion will drive the piston axially of the cylinder.

In the present application, I have disclosed and described a piston particularly adapted for use in an internal combustion engine, but it will be understood that the principle of my piston may be used for other engines, pumps, air-compressors, etc., which utilize pistons.

It will be understood that minor changes may be made from time to time in the exact construction of the piston without departing from the spirit of the invention and scope of the appended claims.

I claim:

1. A piston including a concave head, a dome in the center of said head, and horizontal oil-retaining fins inside of said dome.

2. A piston including a skirt, a concave head, a dome in the center of the said concave head, a skirt depending from said concave head, and an oil chamber between said head and the first-mentioned skirt.

3. A piston including a concave head, a dome in the center of said concave head, a skirt depending from the periphery of said head, an oil receiving chamber formed between said skirt and the said head, and oil ducts extending from said chamber to wrist-pin bearings.

4. In a piston, a concave head, a dome extending upwardly from the center of said head, a skirt extending downwardly from the periphery of said head, beveled edges on said skirt, an oil chamber beneath said head and above a second skirt, a wrist-pin bearing in the upper portion of said second skirt, and oil ducts between said chamber and said wrist-pin bearing.

5. In a piston, a concave head, a dome extending upwardly from the center of said concave head, a skirt extending downwardly from the periphery of said head, internally beveled edges on said skirt, an oil chamber beneath said head and above a second skirt, wrist-pin bearings in the upper portion of said second skirt, and oil ducts between said chamber and said wrist-pin bearings.

6. In a piston, a concave head, a dome extending upwardly in the center of said head, a skirt extending downwardly from the periphery of said head, internally beveled edges on said skirt remote from the periphery of the head, an oil chamber beneath said head and above a second skirt in position to receive oil scraped from cylinder walls by said beveled edges of the first-mentioned skirt, wrist-pin bearings in the upper portion of the said second skirt, and oil ducts between the said oil chamber and the said wrist-pin bearings.

EDWARD J. DUCATE.